United States Patent Office 3,070,162
Patented Dec. 25, 1962

3,070,162
CHEMICAL METHOD FOR CLEANING DISPOSAL AND INJECTION WELLS
Paul Barnard, Jr., Houston, Tex., assignor to The Atlantic Refining Company, Philadelphia, Pa., a corporation of Pennsylvania
No Drawing. Filed Mar. 21, 1960, Ser. No. 16,195
6 Claims. (Cl. 166—38)

The present invention relates to the cleaning of subsurface earth formations which are employed for the disposal or injection of water and, particularly to the cleaning of subsurface formations employed in the disposal of oil field brines and oil-producing formations which are being waterflooded to increase the recovery of oil therefrom.

In connection with oil field operations, it is known that many crude oils produced from subsurface formations contain varying amounts of brine. Such brine is separated from the oil at the earth's surface and must be disposed of so as not to contaminate surface waters. In order to so dispose of the separated brine, the brine is injected into subsurface formations below the water table either above or below the producing formation; and, in some cases, it is injected into the oil-producing formation to help drive oil from the formation.

In addition to the disposal of brines separated from fluids obtained in oil recovery operations, it is often necessary to supplement the natural drive of an oil pool by injecting driving agents, such as water and gas, under pressure. In artificial recovery processes involving the use of water, the injected water may be separated oil field brines, fresh or salt waters from surface sources, or fresh or salt waters obtained from water-producing subsurface formations.

In the disposal of oil field brines or the injection of water in waterflooding operations, injection capacity often becomes seriously restricted due to the deposition of solid materials in the pores of the formation. Injection waters are often found to contain hydrogen sulfide, iron sulfide, sulfur-reducing bacteria and the like. Some of these materials will themselves plug subsurface formations. In addition, other materials present in the injection water will react with incompatible formation waters, metallic injection and well equipment and the rock formations themselves to precipitate solid plugging materials. Finally, various oil-producing operations result in the precipitation of solid plugging materials from naturally occurring formation waters. Such plugging materials include calcium carbonate, calcium sulfate, iron sulfide, iron oxide and other metallic salts. By the very nature of the introduction and formation of plugging materials, the major portion of such plugging occurs in the first several inches of formation face.

In the past, such plugging has been alleviated and injectivity restored by acidizing the formation, treating the formation with various solvents, hydraulically fracturing the formation or recompletion operations. Operations such as fracturing and recompletion are obviously expensive and are avoided if at all possible. On the other hand, it is often found that after three or four treatments with acids or conventional solvents further treatments become totally ineffective. Likewise, even the more expensive fracturing operations become partially ineffective after they have been repeated several times.

It is, therefore, an object of the present invention to provide an improved method for cleaning plugged subsurface formations into which water is being injected.

A further object of the present invention is to provide an improved method for cleaning subsurface formations into which water is being injected to remove solid plugging materials.

Still another object of the present invention is to provide an improved method of cleaning subsurface formations into which water is being injected to remove iron sulfide and elemental sulfur which have caused plugging of the formation.

These and other objects of the present invention will become apparent from the following detailed description.

In accordance with the present invention, it has been found that subsurface formations which have become plugged with solid plugging materials during water injection operations may have their rate of injectivity restored by treating the subsurface formation with a surface active agent which will render the plugging materials water wet; treating the formation with an acid solution adapted to dissolve certain of the plugging materials; thereafter treating the formation with a surface active agent adapted to render the remaining plugging materials oil wet; and, finally, treating the formation with a solvent for elemental sulfur.

Since there are a large number of materials which tend to plug subsurface injection formations and it is impossible or at least impractical to sample the plugging material, it is difficult to predict what particular type of treatment will be effective in restoring injectivity or to theorize on why a particular treatment is effective.

In the present case, it is believed that iron sulfide and free sulfur are the most difficult materials to remove from a plugged formation and are probably most predominant in plugging water injection formations. Although various types of acids heretofore used are effective in dissolving iron sulfide, such acids will not react with oil-wet iron sulfide. Accordingly, it is believed that the first step of the treatment of the instant invention converts oil-wet iron sulfide to water-wet iron sulfide and, thus, permits the acid employed in the second step to effectively dissolve the iron sulfide.

Many oil field brines contain significant amounts of hydrogen sulfide. Further, when iron sulfide is acidized, large volumes of hydrogen sulfide are liberated. Hydrogen sulfide, being a gas, will not tend to plug the formation itself, but it is believed that the conversion of such hydrogen sulfide to free or elemental sulfur does take place, and such elemental sulfur will replug the formation. It is believed that the predominant reaction in the conversion of hydrogen sulfide to elemental sulfur is oxidation. Such oxidation will occur when any water containing hydrogen sulfide is exposed to the atmosphere, and, in water injection operations, open injection systems are subject to this drawback. Oxidation also occurs by the reaction of oxidizing agents with hydrogen sulfide within the well or formation. Similarly, chlorination of water containing hydrogen sulfide, for one reason or another, will also convert hydrogen sulfide to elemental sulfur.

In view of the above, the present invention is based on the theory that elemental sulfur which has been formed following acidization to dissolve iron sulfide must be dissolved in the treatment of an underground injection formation in order for the cleansing treatment of the formation by acidization to be effective. There are a number of materials which can be employed as sulfur solvents. Among these are carbon disulfide, benzene, xylene, toluene, and the like. However, such sulfur solvents will not dissolve water-wet elemental sulfur, and at this stage of the clean-out operation the sulfur has been made water wet by the previous surfactant and acidization treatments. Therefore, it has also been found necessary to precede the injection of the sulfur solvent with a surface active agent which will convert the water-wet sulfur to an oil-wet sulfur. Following this treatment, the oil-wet sulfur may be dissolved with any of the well known sulfur solvents. Placing the sulfur in an oil-wet state in which it can be readily acted upon by a solvent has the additional desirable advantage of permitting the use of sulfur solvents which are comparatively weak solvents.

In carrying out the step of treating the subsurface formation with a surface active agent which will render the plugging materials water wet, any one of a number of known surface active agents may be employed. Such surface active agents may be anionic, cationic, or nonionic in form.

Among the better known anionic types of surface active agents are alkyl aryl sulfonates, alkyl sulfates, sulfated and sulfonated amides and amines, sulfated and sulfonated esters and ethers, alkyl sulfonates, etc. Typical examples of this type of material are ammonium lauryl sulfonate, ammonium di-isopropyl naphthalene sulfonate and the like.

Cationic surface active agents include salts of primary or tertiary amines, quaternary ammonium salts, salts and quaternary derivatives of amino amides, salts and quaternary derivatives of imidazolines, salts and quaternary derivatives of amino esters and oxyethylated amines and amides. Examples of this class are lauryl dimethyl benzyl ammonium chloride, trimethyl-heptadecyl ammonium chloride, and the like.

The nonionic surface active agents generally include simple oil-soluble esters, fatty acid-alkanolamine condensates and polyoxyalkylene esters and ethers. Specific examples of the last group include polyoxyethylated sorbitan fatty acids sold by the Atlas Powder Company under the name "Tween," polyoxyethylated tall oil having twelve moles of ethylene oxide sold by Monsanto Chemical Company under the name "SteroxCD," and polyoxyethylated nonyl phenol having ten moles of ethylene oxide sold by Atlas Powder Company under the name "Aquaness OX 98."

Of the various surface active agents which may be used in water wetting the plugging materials in accordance with the present method, the nonionic materials are preferred. These materials, and particularly the polyoxyalkylene esters and ethers are strong water-wetting agents and have been found most effective in accordance with the present invention.

The selection of an acid for use in acidizing depends to a large extent upon the types of plugging materials which are known to exist or are suspected. There are a variety of diluted acids, containing 10 to 25 percent of acid in an aqueous solution, which are commercially available for cleaning subsurface formations. If iron sulfides, calcium carbonate and the like are the plugging materials, aqueous solutions of 15 percent hydrochloric acid or sulfamic acid have been found quite effective. On the other hand, if, in addition to the iron sulfides, calcium carbonates and the like, the formation is also plugged with sand or clay, it is usually desirable to employ what is termed a "mud acid" in the art. Such acids are generally made up of 15 percent hydrochloric acid and 3 to 6 percent hydrofluoric acid forming materials.

The acid solution should preferably contain a small amount of a corrosion inhibitor adapted to prevent corrosion of metallic equipment by the acid solution. Among such inhibitors are organic inhibitors, such as aniline, pyridine and the like. In most cases, acid solutions or concentrates with the correct amount of inhibitor are commercially available in the industry as inhibited acids.

In carrying out the steps of water wetting the plugging materials and acidizing, these two steps may be carried out separately or in combination. However, the combination treatment is preferred. If a combination of water-wetting agent and acid solution is used, the nonionic or cationic type surfactants should be used since most anionics cannot be used in acid solutions. On the other hand, if the water-wetting operation is carried out as a separate step, some of the anionic type surfactants may be employed.

Although any suitable lipophylic surface active agent of the anionic, cationic or nonionic type may be used for oil wetting plugging materials in the third step of the present method, there are certain limitations which such surface active agents must meet. They should, of course, be oil soluble so that acids and brines will not remove the oil-wet film but a sulfur solvent will remove the film. In addition, the lipophylic sulfactant should be non-emulsifying with acids and brines. The most effective materials of this type which have been found are the strongly oil-wetting mixtures supplied as amine-type corrosion inhibitors for oil field use. Particularly effective are materials containing sulfonic acid salts of oil-soluble fatty diamines derived from aliphatic amines having 8 to 18 carbon atoms in the alkyl chain. Specifically, a corrosion inhibitor sold by Sinclair Oil and Refining Company as "Sinclair P-400" has been found outstanding for this purpose. This material is made up of 25 percent of a sulfonic acid salt of N-alkyl trimethylene tallow diamine, 10 percent nonyl phenol as a dispersant and 65 percent of an aromatic solvent.

The oil-wetting surface active agent may be employed in its pure state, as a concentrated organic solution, such as that specifically mentioned, or concentrates may be further diluted with solvents, such as kerosene, benzene, and the like. Considering the amounts of such materials which are to be used, it is obvious that it is cheaper to employ a diluted solution. It has been found that as high as 90 percent of solvent may be added to the Sinclair P-400 concentrate or, on the basis of the amount of pure surface active agent, as little as 2.5 percent surface active agent can be dissolved in a solvent without destroying the effectiveness of the agent.

As previously pointed out, any of a number of sulfur solvents may be employed in the present invention. These include carbon disulfide, benzene, xylene, and toluene. Although carbon disulfide is more effective as a sulfur solvent than the hydrocarbon solvents, this material has serious drawbacks from a safety standpoint. If carbon disulfide is employed, it is necessary that it be employed only in a dump treatment or that it be hand pumped rather than mechanically pumped. On the other hand, hydrocarbon solvents, such as benzene and the like, do not have this disadvantage and their lesser effectiveness is not a significant drawback since the prior treatment oil wets the sulfur.

Since certain of the sulfur solvents may also be used as a diluent for the oil-wetting surface active agent, the total volume of sulfur solvent can in such cases be split into two parts and one part employed to carry the oil-wetting agent and the other introduced at a later stage. It is, however, necessary that at least some part of the sulfur solvent be introduced as the last step of the treatment. Although a certain amount of sulfur can be dissolved by a sulfur solvent during the oil-wetting treatment, it has been found necessary to thereafter soak the formation with a substantially pure sulfur solvent for a considerable period of time for complete effectiveness. Such soaking is usually effective if a period of 12 to 24 hours is allowed.

Again, recognizing that it is difficult or even impossible to determine the nature of subsurface plugging materials as well as their concentration in the formation, it is impossible to set any specific amounts of cleaning agents which should be employed. However, experience has taught that certain amounts of the specified treating materials will be effective in most cases. If the water-wetting agent is used alone, this material should be present in an amount of about 5 gallons per 1,000 gallons of water, and an effective treatment requires approximately 1,000 gallons of this solution for every 50 feet of sand face. If the water-wetting agent is combined with the acid solution, 5 gallons of the wetting agent may be added to 1,000 gallons of the acid solution. So far as the acid solution is concerned, either with or without the water-wetting agent, approximately 1,000 gallons of solution should be employed for every 50 feet of sand face. An effective amount of oil-wetting agent has been found to be 55 gallons of a concentrate of oil-wetting agent for every 1 to 50 feet of sand face diluted with 5.5 to 275 gallons of solvent. Preferably, a concentrate of oil-wetting agent and solvent diluent are used in the ratio of about 1 to 1. Finally, the sulfur solvent should be employed in an amount of about 275 gallons per 50 feet of sand face in the case of carbon disulfide or about 1,000 gallons per 50 feet of sand face in the case of benzene, xylene, and the like.

In the application of the method of this invention it has also been found that backwashing or backflowing should not be practiced after the treatment since this operation tends to pull plugging materials back into the well and cause replugging of the formation. Instead, normal injection operations should be resumed immediately after the treatment is completed.

As previously pointed out, the amounts of materials to be employed, the specific materials used and the procedure for cleaning a particular injection well must be adapted to the particular characteristics of the well and the formation being treated. Accordingly, the following specific examples of actual field treatments are given by way of illustration only.

*Example No. 1.*—Twelve salt water disposal wells located adjacent an oil-producing area were drilled into a formation which required no injection pressure. Accordingly, injection into this formation should have been quite easy, and at the beginning of operations these wells were adequate to dispose of all salt water separated from the crude oil of the producing area. However, after a period of time, these wells became plugged, and conventional methods of cleaning the wells failed to restore the original injection capacity. Each of the subject wells were treated by first injecting a mixture of 1,000 gallons of 15 percent inhibited hydrochloric acid and 5 gallons of Aquaness OX 98. Thereafter, a mixture of 15 gallons of Sinclair P–400 oil-wetting agent and 15 gallons of kerosene were spotted at the sand face and the well shut in for one hour. Following this, two more treatments with oil-wetting agent were carried out utilizing 15 gallons of oil-wetting agent and 15 gallons of kerosene followed by 25 gallons of oil-wetting agent and 25 gallons of kerosene, in each case shutting in the well for one hour to permit the oil-wetting agent to contact and enter the injection formation. Following the treatment with oil-wetting agent, 275 gallons of carbon disulfide were disposed in the well opposite the formation being treated, and the well was shut in overnight, or in some cases for a period of approximately 15 hours.

Following the subject treatments, injection of salt water was begun, and it was found that the orginal injection capacity of the wells had been regained. Since the original treatment of these 12 wells, the cleaning treatment has been repeated as needed every 6 to 12 months and the injection capacity has been mantained for several years.

*Example No. 2.*—A salt water disposal well requiring injection pressure for water injection had become plugged to the extent of being limited to an injection rate of about 100 barrels of brine per day. The flow line between the water injection pump and the injection well was blown free of salt water by the use of gas pressure. Following this, 500 gallons of inhibited sulfamic acid were mixed with 2.5 gallons of Aquaness OX 98 and introduced into the flow line. Sufficient pressure was maintained behind the injected fluid by pumping salt water behind the solution with the injection pump. The well was shut in for a period of 2 to 3 hours to allow intimate contact between the plugging materials and the acid solution. Salt water was again blown out of the flow line, and 55 gallons of Sinclair P–400 diluted with 55 gallons of solvent followed by salt water were hand pumped into the well. The well was again shut in for a period of 2 to 3 hours. After blowing salt water out of the flow line, 165 gallons of carbon disulfide were hand pumped into the well followed by another volume of salt water, and the well was shut in overnight.

As a result of the subject treatment, an injection capacity of 700 to 800 barrels per day was attained, and this capacity continued for one year.

*Example No. 3.*—Two salt water disposal wells having 4 separate disposal formations and requiring injection pressure were treated in accordance with the present method. These wells had a combined injection rate of 3,500 barrels per day prior to treatment. Each zone of the 2 wells was treated by setting a straddle packer to pack off a single injection formation. One thousand gallons of inhibited mud acid mixed with 5 gallons of Aquaness OX 98 were mechanically pumped into the formation. Thereafter, a mixture of 55 gallons of Sinclaim P–400 and 500 gallons of benzene were pumped into the formation. This was then followed by the injection of an additional 500 gallons of benzene and letting the well soak overnight.

Following the subject treatment, the injection capacity of the wells had been increased to 8,000 barrels per day.

Having described and exemplified my invention, a number of modifications and variations will be apparent to those skilled in the art without departing from the invention as set forth in the appended claims.

I claim:

1. A method for cleaning a subsurface earth formation traversed by a wellbore, the permeability to fluid of said formation having been reduced by deposition therein of water-insoluble, solid plugging materials including acid-soluble and acid-insoluble plugging materials, comprising injecting into said wellbore and thence to said formation a hydrophylic surface active agent to contact said plugging materials, injecting into said wellbore and thence to said formation an acid to contact and dissolve at least part of said acid-soluble plugging materials, injecting into said wellbore and thence to said formation a nonemulsifying, lipophylic surface active agent to contact said acid-insoluble plugging materials and any acid-insoluble plugging materials formed by the previous steps and injecting into said wellbore and thence to said formation a solvent for sulfur to contact and dissolve at least part of said acid-insoluble plugging materials and any acid-insoluble plugging materials and any acid-insoluble plugging materials formed by the previous steps.

2. A method in accordance with claim 1 wherein the hydrophylic surface active agent is of the nonionic type.

3. A method in accordance with claim 1 wherein the lipophylic surface active agent is a sulfonic acid salt of an oil-soluble fatty diamine.

4. A method in accordance with claim 1 wherein the solvent for sulfur is a hydrocarbon solvent.

5. A method for cleaning a subsurface earth formation traversed by a wellbore, the permeability to fluid of said formation having been reduced by deposition therein of water-insoluble, solid plugging materials including acid-soluble and acid-insoluble plugging materials comprising injecting into said wellbore and thence to said formation a mixture of a hydrophylic surface active agent and an acid to contact and dissolve at least part of said acid-soluble plugging materials, thereafter injecting into said wellbore and thence to said formation a nonemulsifying, lipophylic surface active agent to contact said acid-insoluble plugging materials and any acid-insoluble plugging materials formed by the previous step, and injecting a solvent for sulfur to contact and dissolve at least part of said acid-insoluble plugging materials and any acid-insoluble plugging materials formed by the previous steps.

6. A method for cleaning a subsurface earth formation traversed by a wellbore, the permeability to fluid of said formation having been reduced by deposition therein of water-insoluble, solid plugging materials including acid-soluble and acid-insoluble plugging materials comprising injecting into said well bore and thence to said formation a hydrophylic surface active agent to contact said plugging materials, injecting into said wellbore and thence to said formation an acid to contact and dissolve at least part of said acid-soluble plugging materials, thereafter injecting into said wellbore and thence to said formation a nonemulsifying, lipophylic surface active agent dissolved in a solvent for sulfur to contact said acid-insoluble plugging materials and any acid-insoluble plugging materials formed by the previous steps, and injecting into said wellbore and thence to said formation an additional amount of said solvent for sulfur to contact and dissolve at least part of said acid-insoluble plugging materials and any acid-insoluble plugging materials formed by the previous steps.

References Cited in the file of this patent
UNITED STATES PATENTS

| | | |
|---|---|---|
| 2,161,085 | Phalen | June 6, 1939 |
| 2,877,848 | Case | Mar. 17, 1959 |

UNITED STATES PATENT OFFICE
CERTIFICATE OF CORRECTION

Patent No. 3,070,162                      December 25, 1962

Paul Barnard, Jr.

It is hereby certified that error appears in the above numbered patent requiring correction and that the said Letters Patent should read as corrected below.

Column 3, line 32, for '"Tween"' read -- "Tweens" --; line 34, for '"SteroxCD,"' read -- "Sterox CD," --; line 42, for "alklene" read -- alkylene --; column 6, line 51, strike out "and any acid-insoluble plugging materials".

Signed and sealed this 11th day of June 1963.

(SEAL)
Attest:

ERNEST W. SWIDER                      DAVID L. LADD
Attesting Officer                      Commissioner of Patents